UNITED STATES PATENT OFFICE.

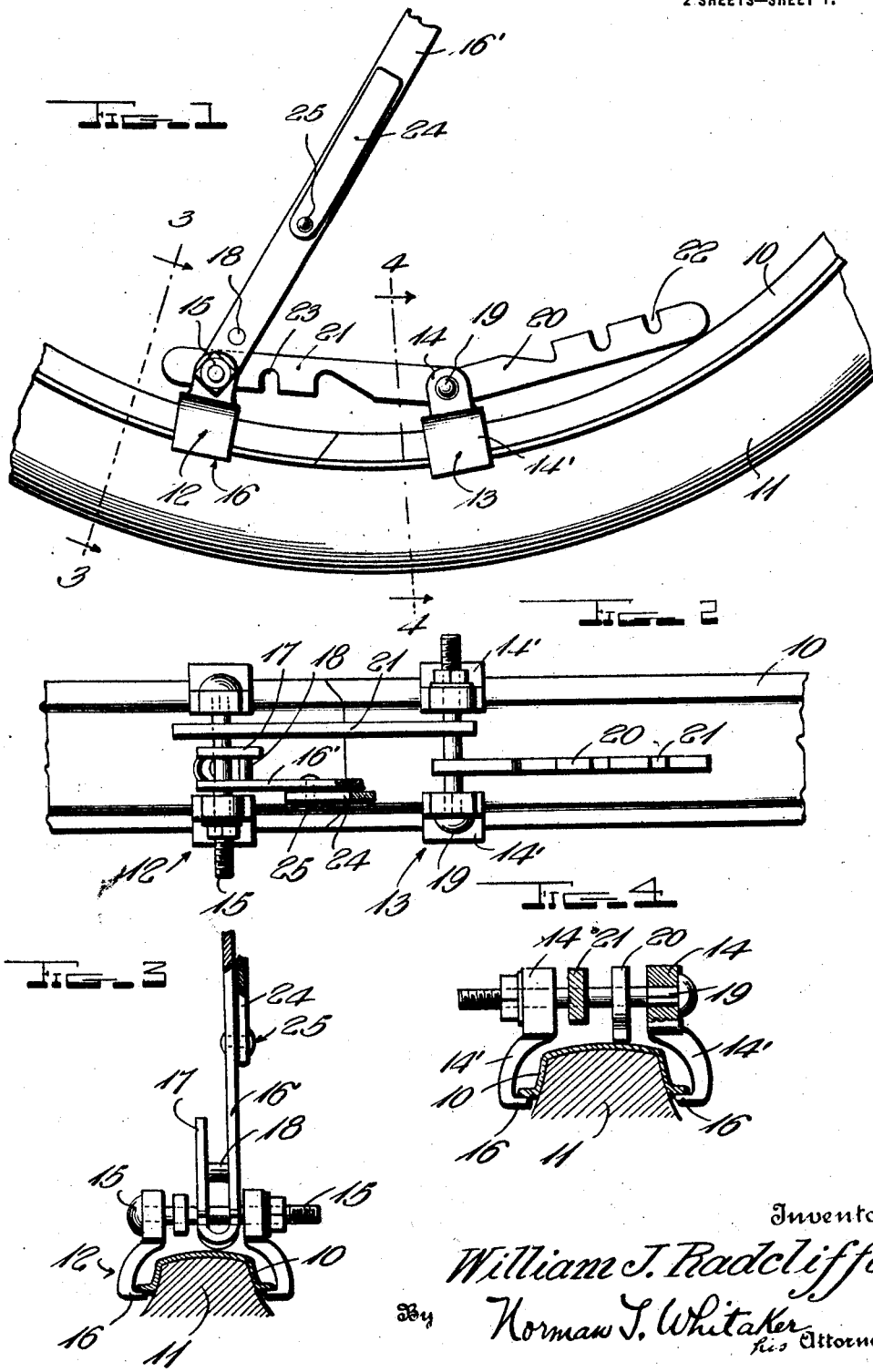

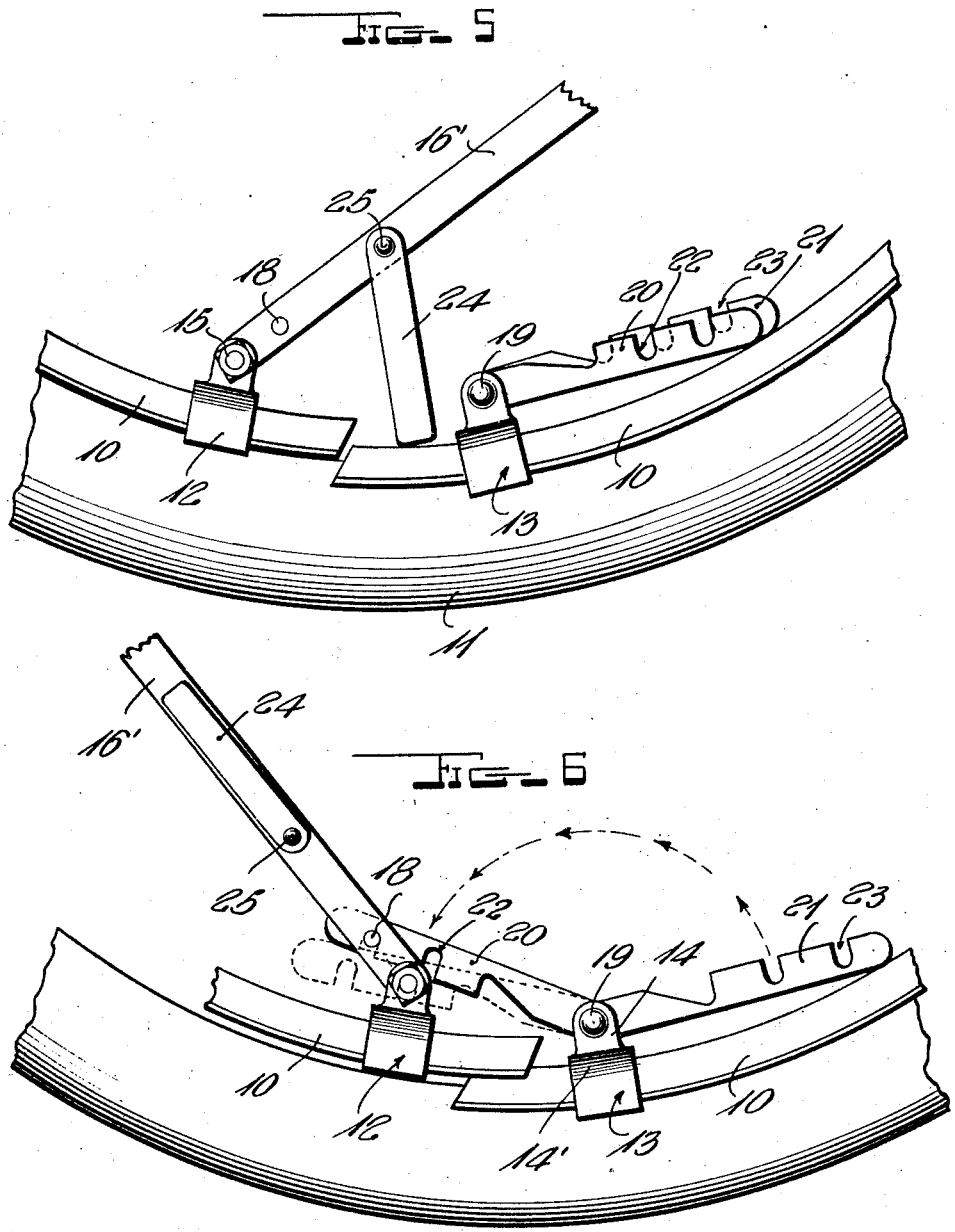

WILLIAM J. RADCLIFFE, OF WILLIAMSFIELD, ILLINOIS.

RIM-TOOL.

1,357,822.   Specification of Letters Patent.   Patented Nov. 2, 1920.

Application filed June 14, 1919. Serial No. 304,225.

*To all whom it may concern:*

Be it known that I, WILLIAM J. RADCLIFFE, a citizen of the United States, and a resident of Williamsfield, in the county of Knox and State of Illinois, have invented new and useful Improvements in Rim-Tools, of which the following is a specification.

This invention relates to rim tools and has particular reference to that class of rim tools employed as a means for contracting or expanding automobile tire rims whereby the automobile tire may be quickly mounted upon or detached from the rim.

An important object of the invention is to provide in a tool of the character mentioned a means whereby the several elements thereof may be made to coöperatively function either during the contraction or expansion of the rim with which the tool is particularly designed to be used.

A further object of the invention is to provide a tool of the above mentioned class which is simple in construction, inexpensive to manufacture and reliable in operation.

Other objects and advantages of the invention will be apparent during the course of the following description taken in connection with the accompanying drawings.

In the drawings, forming a part of this specification and wherein like numerals are employed to designate like parts throughout the same, Figure 1 is a side elevation of the device embodying my invention, the same being shown mounted upon an automobile rim prior to the breaking thereof, Fig. 2 is a top plan view of the device, certain elements thereof being shown in section, Fig. 3 is a transverse sectional view taken substantially on line 3—3 of Fig. 1.

Fig. 4 is a transverse sectional view taken substantially on line 4—4 of Fig. 1.

Fig. 5 is a similar view to that of Fig. 1, certain elements thereof being shown in their respective positions immediately subsequent to the breaking of the rim, and, Fig. 6 is a similar view to that of Fig. 5, certain elements thereof being shown in their respective positions during the contraction of the rim.

In the drawings, wherein for the purpose of illustration is shown a preferred form of my invention, the numeral 10 indicates an automobile rim of the section type having mounted thereupon a conventional automobile tire 11. As a means for clamping the device embodying my invention to the rim 10 there is provided two pairs of ears, which pairs are represented in their entirety by numerals 12 and 13. Each of the ears comprises an arm 14 having a curved portion 14', which curved portion is adapted to fit snugly upon the rim 10 and is provided with a hooked end 16 adapted to engage the outer edge of the rim 10 as clearly shown in Fig. 3. Through the arms 14 of the pair of ears 12 there is passed a bolt 15 which serves both as a means for clamping the ears upon the rim 10 and as a support for an operating lever 16' journaled thereupon. The operating lever 16' at its pivoted end is provided with an arm 17, which arm together with the lever 16' serves as a means for holding a pin 18 disposed therebetween as clearly shown in Fig. 3. The pair of ears 13 are substantially identical with the pair 12 hereinbefore described, they being provided with a bolt 19 identical with that indicated by the numeral 15 and hereinbefore described. To the bolt 19 intermediate the pair of ears 13 there is pivotally connected a pair of links 20 and 21, which links are provided at suitable intervals with notches 22 and 23 respectively, the notches 22 and 23 being adapted to receive respectively the pin 18 and bolt 15 as clearly shown in Fig. 6 during the operation of the device.

To the lever 16' there is pivotally connected a member 24, it being free to swing about its pivot 25 as clearly shown in Fig. 5. The friction, however, afforded at its pivotal connection is sufficient to normally retain it in the position shown in Fig. 1 when not in use.

In use, to break the sectional rim 10 the device as a whole is securely fastened in the position shown in Fig. 1 by means of bolts 15 and 19. The ears 12 and 13 are so spaced adjacent the split of the rim 10, clearly shown in Fig. 1, to permit the notch 23 at the end of the link 21 to receive the bolt 15. The link 21 is then moved to the position shown in Fig. 5 whereupon the member 24 is swung upon its pivot 25 to the position shown in Fig. 5. The lever 16' is then moved downwardly about the bolt 15 as a pivot, thereby bringing the lower end of the member 24 into engagement with the rim 10 in proximity to the split. By continuing to move the lever 16' downwardly one end of the rim 10 is elevated while its adjacent end is moved downwardly as shown in Fig. 5, thereby breaking the rim. Link 20 is then moved about the bolt 19 as its axis to permit notch 22 to receive the pin 18. The lever 16' is then moved from the position shown in Fig. 5 to the position shown in Fig. 6 whereupon the adjacent ends of the split rim 10 are moved one over the other, thereby contracting the rim. After the rim is contracted sufficiently to permit easy removal of the tire 11 the link 21 is moved from the full line position shown in Fig. 6 to the dotted line position shown therein, the notch 23 thereof receiving the bolt 15. When the notches 22 and 23 of links 20 and 21 respectively engage pin 18 and bolt 15 respectively as shown in Fig. 6, the several coöperating elements of the device as a whole are locked in the contracted position whereupon the tire 11 may be easily removed from the rim 10. Of course, it is to be understood that when the member 24 has served its function in facilitating the breaking of the rim 10 it is moved to the position shown in Fig. 6 prior to the contraction of the rim 10. In expanding the rim whereupon its ends are moved to the position shown in Fig. 1 the successive operations of the various elements are exactly opposite to those described in connection with the contraction of the rim and these operations will be readily understood by those skilled in the art to which this invention pertains.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, what I claim as new and desire to secure and protect by Letters Patent of the United States, is:

1. A sectional rim tool comprising two pairs of ears adapted to be secured to the rim adjacent the split thereof, an operating lever pivotally connected to one pair of said ears, said lever being provided with a pin, a pair of notched arms pivotally connected to the other pair of said ears, the notches of one of said arms being adapted to engage the pivotal connection between said operating lever and one pair of ears, the notches of the other lever being adapted to engage said pin.

2. A sectional rim tool comprising two pairs of ears adapted to be secured to the rim adjacent the split thereof, an operating lever pivotally connected to one pair of said ears, said lever being provided with a pin, a pair of notched arms pivotally connected to the other pair of said ears, the notches of one of said arms being adapted to engage the pivotal connection between said operating lever and one pair of ears, the notches of the other arm being adapted to engage said pin, a member pivotally connected to said operating lever, said member being adapted to engage the rim adjacent the split thereof to facilitate the breaking of the rim when said operating lever is swung about its pivotal connection.

WILLIAM J. RADCLIFFE.